(12) United States Patent
Wang

(10) Patent No.: US 11,853,673 B2
(45) Date of Patent: Dec. 26, 2023

(54) STANDARD CELL TEMPLATE AND SEMICONDUCTOR STRUCTURE

(71) Applicant: CHANGXIN MEMORY TECHNOLOGIES, INC., Hefei (CN)

(72) Inventor: Peihuan Wang, Hefei (CN)

(73) Assignee: CHANGXIN MEMORY TECHNOLOGIES, INC., Anhui (CN)

( * ) Notice: Subject to any disclaimer, the term of this patent is extended or adjusted under 35 U.S.C. 154(b) by 48 days.

(21) Appl. No.: 17/505,683

(22) Filed: Oct. 20, 2021

(65) Prior Publication Data
US 2022/0253586 A1 Aug. 11, 2022

Related U.S. Application Data

(63) Continuation of application No. PCT/CN2021/107779, filed on Jul. 22, 2021.

(30) Foreign Application Priority Data

Feb. 5, 2021 (CN) .......................... 202110163720.X

(51) Int. Cl.
*G06F 30/00* (2020.01)
*G06F 30/392* (2020.01)
(Continued)

(52) U.S. Cl.
CPC .......... *G06F 30/392* (2020.01); *G06F 30/394* (2020.01); *H01L 27/0207* (2013.01)

(58) Field of Classification Search
CPC .. G06F 30/392; G06F 30/394; G06F 2111/20; H01L 27/0207; H01L 27/092;
(Continued)

(56) References Cited

U.S. PATENT DOCUMENTS

| 5,506,428 A | 4/1996 | Inoue et al. |
| 6,084,255 A | 7/2000 | Ueda et al. |

(Continued)

FOREIGN PATENT DOCUMENTS

| CN | 103035577 A | 4/2013 |
| CN | 103928402 A | 7/2014 |

(Continued)

OTHER PUBLICATIONS

European Search Report cited in EP21859332 dated Oct. 27, 2022, 10 pages.

(Continued)

*Primary Examiner* — Naum Levin
(74) *Attorney, Agent, or Firm* — Cooper Legal Group, LLC

(57) ABSTRACT

The present disclosure provides a standard cell template and a semiconductor structure. The standard cell template includes a first well region and a second well region, arranged along a first direction; a first gate pattern, located in the first well region and extending along the first direction, for defining a first gate; a second gate pattern, located in the second well region and extending along the first direction, for defining a second gate; and a gate electrical connection pattern, located between the first gate pattern and the second gate pattern, for defining a gate electrical connection structure; where the gate electrical connection structure is arranged on the same layer as the first gate and the second gate to electrically connect the first gate and/or the second gate.

18 Claims, 10 Drawing Sheets

(51) Int. Cl.
*H01L 27/02* (2006.01)
*G06F 30/394* (2020.01)

(58) Field of Classification Search
CPC ........... H01L 27/088; H01L 21/823828; H01L 2027/11875; H01L 23/535; H10B 12/00
See application file for complete search history.

(56) References Cited

U.S. PATENT DOCUMENTS

| | | | |
|---|---|---|---|
| 6,194,252 B1 | 2/2001 | Yamaguchi | |
| 6,774,412 B2 * | 8/2004 | Komaki | H01L 27/11807 257/210 |
| 7,456,447 B2 * | 11/2008 | Tatsumi | H01L 27/0207 257/E27.11 |
| 7,875,909 B2 | 1/2011 | Uchida | |
| 7,932,544 B2 * | 4/2011 | Becker | G06F 30/392 257/E27.099 |
| 7,956,421 B2 * | 6/2011 | Becker | H01L 27/0207 257/369 |
| 8,274,099 B2 * | 9/2012 | Becker | H01L 21/823475 257/211 |
| 9,035,392 B2 | 5/2015 | Tsuda et al. | |
| 9,196,725 B2 | 11/2015 | Han et al. | |
| 9,478,636 B2 * | 10/2016 | Chen | H01L 23/5283 |
| 9,972,571 B1 | 5/2018 | Chen | H01L 21/823878 |
| 10,332,819 B1 * | 6/2019 | Liaw | H01L 29/66007 |
| 10,579,771 B2 | 3/2020 | Do et al. | |
| 10,756,114 B2 * | 8/2020 | Liaw | H01L 27/0207 |
| 10,808,333 B2 * | 10/2020 | Ito | G06F 30/392 |
| 10,916,550 B2 * | 2/2021 | Liaw | H01L 29/0673 |
| 10,964,784 B2 * | 3/2021 | Liaw | H01L 21/823892 |
| 11,024,549 B2 * | 6/2021 | Liaw | H01L 21/823481 |
| 11,042,686 B2 | 6/2021 | Do et al. | |
| 11,211,387 B2 * | 12/2021 | Liaw | H01L 29/36 |
| 11,631,661 B2 * | 4/2023 | Hsieh | H01L 27/092 716/139 |
| 2003/0023946 A1 * | 1/2003 | Lin | H01L 27/11807 716/120 |
| 2007/0138510 A1 | 6/2007 | Uchida | |
| 2009/0224317 A1 | 9/2009 | Becker | |
| 2011/0042750 A1 | 2/2011 | Chuang et al. | |
| 2019/0211475 A1 * | 7/2019 | Ito | C12N 5/0606 |

FOREIGN PATENT DOCUMENTS

| | | | | |
|---|---|---|---|---|
| CN | 103022032 B | | 11/2015 | |
| CN | 112086458 A | * | 12/2020 | ....... H01L 21/02381 |
| CN | 112992892 A | | 6/2021 | |
| JP | S63310136 A | | 12/1988 | |
| JP | H0758301 A | | 3/1995 | |
| JP | 2007173474 A | | 7/2007 | |
| JP | 2009170520 A | | 7/2009 | |
| JP | 2009176968 A | | 8/2009 | |
| JP | 2010074125 A | | 4/2010 | |
| JP | 2010165969 A | | 7/2010 | |
| JP | 6972031 B2 | * | 11/2021 | ......... G06F 17/5068 |
| KR | 100216882 B1 | * | 10/1999 | |
| KR | 20190019952 A | * | 2/2019 | |
| RU | 2513644 C1 | | 4/2014 | |
| WO | WO-9718591 A1 | * | 5/1997 | ......... H01L 27/0207 |

OTHER PUBLICATIONS

International Search Report cited in PCT/CN2021/107779 dated Nov. 3, 2021, 10 pages.
JP Office Action cited in JP2022-546369, dated Aug. 29, 2023, 7 pages.
RU Office Action cited in RU2023111642/28(024869), dated Sep. 25, 2023, 15 pages.

* cited by examiner

US 11,853,673 B2

STANDARD CELL TEMPLATE AND SEMICONDUCTOR STRUCTURE

CROSS-REFERENCE TO RELATED APPLICATIONS

This is a continuation of International Patent Application No. PCT/CN2021/107779, filed on Jul. 22, 2021, which claims the priority to Chinese Patent Application No. 202110163720.X, titled "STANDARD CELL TEMPLATE AND SEMICONDUCTOR STRUCTURE" and filed on Feb. 5, 2021. The entire contents of International Patent Application No. PCT/CN2021/107779 and Chinese Patent Application No. 202110163720.X are incorporated herein by reference.

TECHNICAL FIELD

The present disclosure relates to, but is not limited to, a standard cell template and a semiconductor structure.

BACKGROUND

Based on a standard cell library (SCL), integrated circuit (IC) design can carry out logic synthesis and layout route, which improves the efficiency of circuit design.

The SCL includes multiple pre-designed standard cell templates, which are provided for the IC designer or circuit design synthesis tool to complete IC layout design according to design requirements.

SUMMARY

An overview of the subject matter detailed in the present disclosure is provided below, which is not intended to limit the protection scope of the claims.

The present disclosure provides a standard cell template and a semiconductor structure.

A first aspect of the present disclosure provides a standard cell template. The standard cell template includes a first well region and a second well region, arranged along a first direction; a first gate pattern, located in the first well region and extending along the first direction, for defining a first gate; a second gate pattern, located in the second well region and extending along the first direction, for defining a second gate; and a gate electrical connection pattern, located between the first gate pattern and the second gate pattern, for defining a gate electrical connection structure; where the gate electrical connection structure is arranged on the same layer as the first gate and the second gate to electrically connect the first gate and/or the second gate.

A second aspect of the present disclosure provides a semiconductor structure. The semiconductor structure includes: a substrate, where the substrate is provided with a first well and a second well, the first well and the second well are arranged along a first direction; a first gate, located on the substrate where the first well is located and extending along the first direction; a second gate, located on the substrate where the second well is located and extending along the first direction; and a gate electrical connection structure, located on the substrate and arranged on the same layer as the first gate and the second gate to electrically connect the first gate and/or the second gate.

BRIEF DESCRIPTION OF THE DRAWINGS

The drawings incorporated into the specification and constituting part of the specification illustrate the embodiments of the present disclosure, and are used together with the description to explain the principles of the embodiments of the present disclosure. In these drawings, similar reference numerals are used to represent similar elements. The drawings in the following description are part rather than all of the embodiments of the present disclosure. Those skilled in the art may derive other drawings based on these drawings without creative efforts.

DETAILED DESCRIPTION

The technical solutions in the embodiments of the present disclosure are described below clearly and completely with reference to the drawings in the embodiments of the present disclosure. Apparently, the described embodiments are merely part rather than all of the embodiments of the present disclosure. All other embodiments obtained by those skilled in the art based on the embodiments of the present disclosure without creative efforts should fall within the protection scope of the present disclosure. It should be noted that the embodiments in the present disclosure and features in the embodiments may be combined with each other in a non-conflicting manner.

The existing semiconductor structure fabricated by using a standard cell template has high power consumption and poor signal quality.

Figure 1:
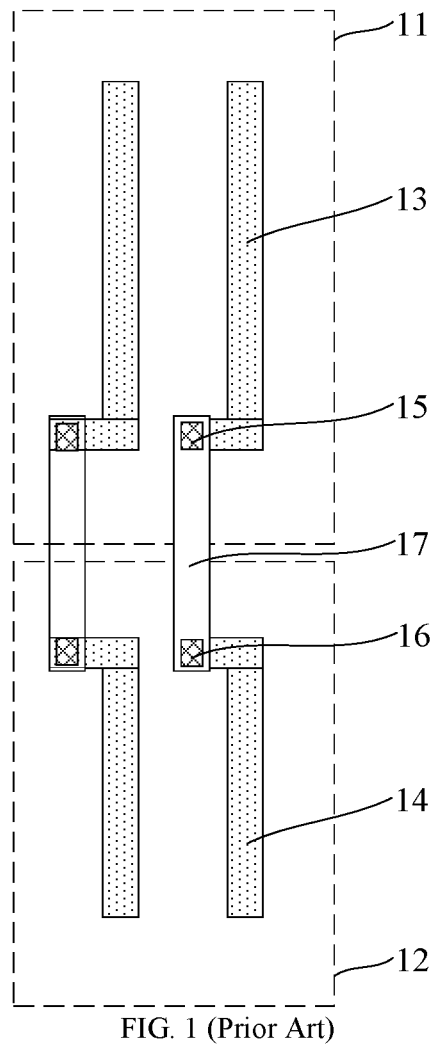
FIG. 1 is a view illustrating a structure of a standard cell template.
Figure 2:
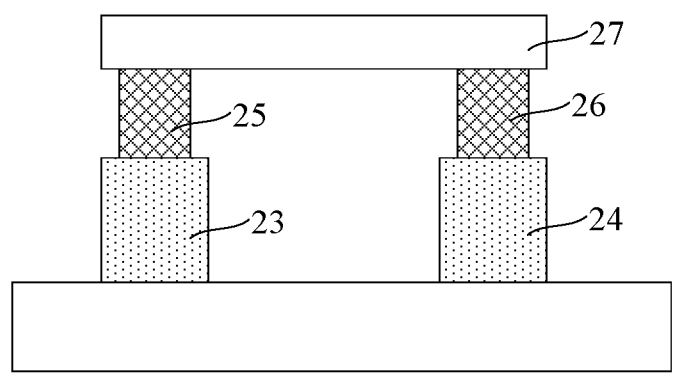
FIG. 2 is a partial sectional view illustrating a structure of a semiconductor structure fabricated by using the standard cell template shown in FIG. 1.

FIG. 1 is a view illustrating a structure of a standard cell template; and FIG. 2 is a partial sectional view illustrating a structure of a semiconductor structure fabricated by using the standard cell template shown in FIG. 1.

Referring to FIGS. 1 and 2, the standard cell template includes: an N-type well region 11 and a P-type well region 12 arranged adjacently; at least one first gate pattern 13 located in the N-type well region 11, for defining a first gate 23; at least one second gate pattern 14 located in the P-type well region 12, for defining a second gate 24; a first contact hole pattern 15 located on the first gate pattern 13, for defining a first contact hole structure 25 electrically connected to the first gate 23; a second contact hole pattern 16 located on the second gate pattern 14, for defining a second contact hole structure 26 electrically connected to the second gate 24; and an electrical connection pattern 17 spanning the N-type well region 11 and the P-type well region 12, and connecting the first contact hole pattern 15 and the second contact hole pattern 16, for defining an electrical connection layer 27, where the electrical connection layer 27 is electrically connected to the first contact hole structure 25 and the second contact hole structure 26; and the electrical connection layer 27 is a metal layer for electrical connection between the first gate 23 and the second gate 24.

As shown in FIG. 2, an electrical connection path between the first gate 23 and the second gate 24 is defined by the first contact hole structure 25, the electrical connection layer 27 and the second contact hole structure 26. The electrical connection path is long and has a large resistance. In addition, the electrical connection layer 27, the first contact hole structure 25 and the second contact hole structure 26 themselves have a large sheet resistance. Both of two aspects will lead to an increase in the resistance and capacitance delay (RC delay) of the semiconductor structure. The power consumption of the semiconductor structure will increase and the operating speed thereof will decrease, which will affect the signal quality on the first gate 23 and/or the second gate 24. The signal quality includes signal delay, signal rise time or signal fall time, etc. If a memory uses such a semiconductor structure, the memory will face the problems of high power consumption and slow storage speed.

In addition, if the above-mentioned standard cell template is used for circuit design, the circuit layout will be irregular and the layout design efficiency will be low.

An embodiment of the present disclosure provides a standard cell template. The standard cell template designs a gate electrical connection pattern for defining a gate electrical connection structure, where the gate electrical connection structure is arranged on the same layer as a first gate and/or a second gate. When the standard cell template is used for layout design, there is no need to design a contact hole structure to implement the electrical connection of upper and lower layers, thereby reducing the resistance of a semiconductor structure corresponding to the layout. In addition, due to the gate electrical connection pattern, when the standard cell template is used for layout design, the arrangement of the gate electrical connection pattern is more regular. This reduces the difficulty and time of layout design, reduces the area of the layout, and reduces the deviation in the process of manufacturing the semiconductor structure corresponding to the layout.

Figure 3:
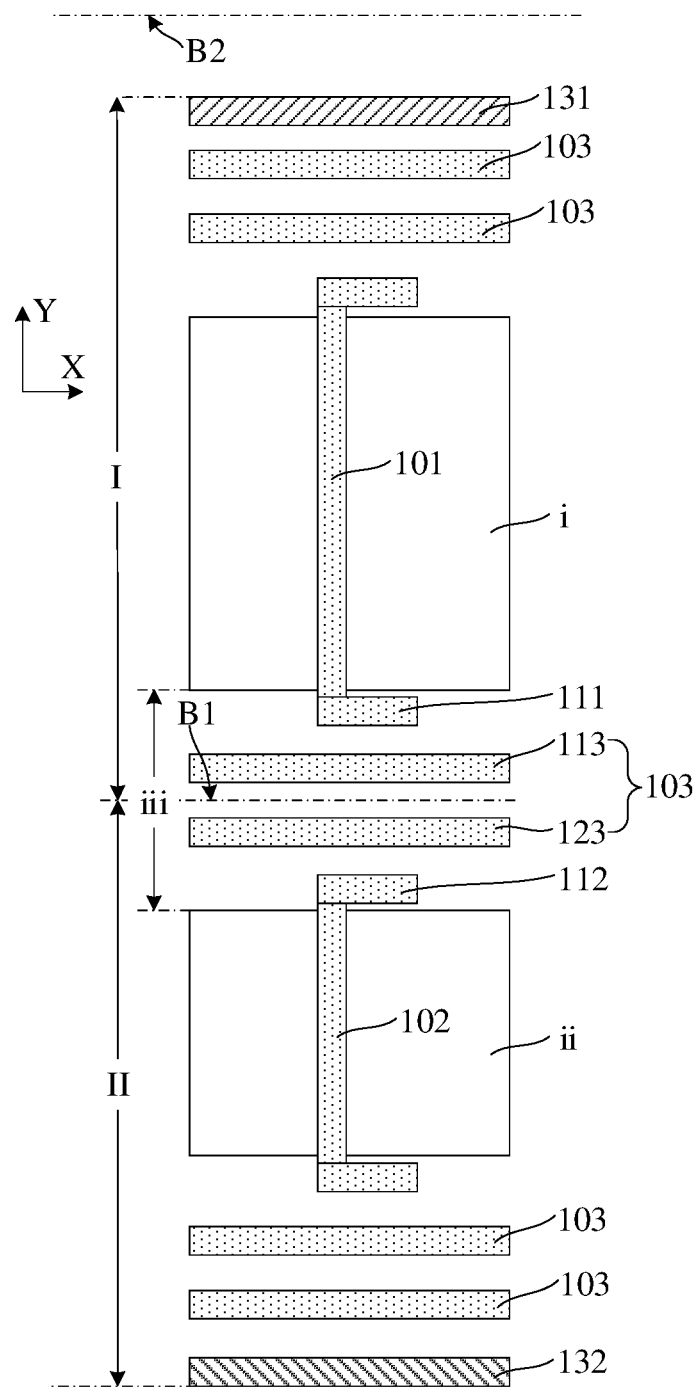
FIG. 3 is a view illustrating a first structure of a standard cell template according to a first embodiment of the present disclosure.

FIG. 3 is a view illustrating a first structure of a standard cell template according to a first embodiment of the present disclosure.

Referring to FIG. 3, in this embodiment, the standard cell template includes a first well region I and a second well region II arranged along a first direction Y; a first gate pattern 101, located in the first well region I and extending along the first direction Y, for defining a first gate; a second gate pattern 102, located in the second well region II and extending along the first direction Y, for defining a second gate; and a gate electrical connection pattern 103, located between the first gate pattern 101 and the second gate pattern 102, for defining a gate electrical connection structure, where the gate electrical connection structure is arranged on the same layer as the first gate and the second gate to electrically connect the first gate and/or the second gate.

The standard cell template provided by this embodiment is a basis for creating a layout. In an actual application, according to a specific circuit structure, an actual layout is designed based on the standard cell template.

Since the gate electrical connection structure is arranged on the same layer as the first gate and the second gate, when a circuit structure corresponding to the designed layout needs to satisfy the electrical connection of the first gate and/or the second gate, there is no need to provide a contact hole structure to implement the electrical connection of upper and lower layers. This shortens the electrical connection path between the gate electrical connection structure and the first gate and/or the second gate, and avoids excessive resistance caused by the large sheet resistance of the contact hole structure. Therefore, the standard cell template provided by this embodiment can reduce the power consumption and RC delay of the circuit structure, for example, it can improve the signal quality on the first gate and/or the second gate.

The standard cell template provided by this embodiment is described in detail below with reference to FIG. 3.

The standard cell template provided by this embodiment may be applied to a memory, such as a dynamic random access memory (DRAM), a static random access memory (SRAM), a magneto resistive random access memory (MRAM), a ferroelectric random access memory (FeRAM), a phase change random access memory (PCRAM), a high bandwidth memory (HBM), an NAND flash memory or an NOR flash memory. The DRAM may be a double data rate (DDR) memory, a low power double data rate (LPDDR) memory or a graphics double data rate (GDDR) memory.

The standard cell template defines two metal oxide semiconductor (MOS) transistors. The first well region I is used to define a well of one of the MOS transistors, and the second well region II is used to define a well of the other MOS transistor. In this embodiment, for example, the first well region I defines an N-type well, and the second well region II defines a P-type well, that is, the types of the two MOS transistors are different. In other embodiments, the types of the two MOS transistors may be the same, for example, both are negative-channel metal-oxide semiconductor (NMOS) transistors or both are positive-channel metal-oxide semiconductor (PMOS) transistors.

In this embodiment, the first well region I is adjacent to the second well region II, that is, a boundary of the first well region I coincides with a boundary of the second well region II. It is understandable that in other embodiments, the standard cell template may also adopt an isolated layout. That is, the first well region and the second well region are spaced apart, and an isolation region is located between the first well region and the second well region to define an isolation structure.

Since the first well region I defines an N-type well and the second well region II defines a P-type well, the first well region I has a first height greater than a second height of the second well region II. It is understandable that the first height and the second height respectively refer to a width in the first direction Y.

The first gate pattern 101 has a stripe shape and is located in a part of the first well region I, and the second gate pattern 102 has a stripe shape and is located in a part of the second well region II.

The first well region I includes a first MOS region i. The first gate pattern 101 spans the first MOS region i. Alternatively, in the first direction Y, a region where the first gate pattern 101 is located is defined as the first MOS region i. The first MOS region i may also be referred to as a first active region. In the first direction Y, the width of the first MOS region i is the same as that of the first gate pattern 101.

The second well region II includes a second MOS region ii. The second gate pattern 102 spans the second MOS region ii. Alternatively, in the first direction Y, a region where the second gate pattern 102 is located is defined as the second MOS region ii. The second MOS region ii may also be referred to as a second active region. In the first direction, the width of the second MOS region ii is equal to that of the second gate pattern 102.

The standard cell template further includes an intermediate region iii, the intermediate region is located between the first MOS region i and the second MOS region ii. In order to reduce a position deviation of a layout created by using the standard cell template and improve the consistency of positions of first well regions I in different circuit layouts created by using the same standard cell template, in this embodiment, the first well region I has a first boundary B1 facing toward the second well region II, and the first boundary B1 is located in the middle of the intermediate region iii. That is, in the first direction Y, a distance from the first boundary B1 to a boundary of the adjacent first MOS region i is a first distance, and a distance from the first boundary B1 to a boundary of the adjacent second MOS region ii is a second distance. The second distance is equal to the first distance. It is understandable that in other embodiments, the first boundary may also have other positional relationship while satisfying the requirements of Layout Design Rule (LDR) and Design Rule Check (DRC).

In this embodiment, the standard cell template may further include a first gate extension pattern 111. The first gate extension pattern 111 is located in the first well region I and is connected to an end of the first gate pattern 101, for defining a first gate extension structure. The first gate extension pattern 111 is located outside the first MOS region i. The first gate extension pattern 111 has a stripe shape, and has an extension direction that is different from the first direction Y. The extension direction of the first gate extension pattern 111 may be a second direction X, and the second direction X may be perpendicular to the first direction Y.

The first gate extension pattern 111 enables the electrical connection of the first gate and the gate electrical connection structure through the first gate extension structure. Therefore, an electrical connection window is added between the first gate and the gate electrical connection structure, thereby reducing the difficulty of the corresponding manufacturing process, such as reducing the alignment accuracy. In the second direction X, the width of the first gate extension pattern 111 is greater than that of the first gate pattern 101. Compared with a solution in which a first auxiliary pattern is directly designed between the first gate pattern 101 and the gate electrical connection pattern 103, the space of the first auxiliary pattern designed between the first gate extension pattern 111 and the gate electrical connection pattern 103 is much larger. In the second direction X, the width of the space increases from the width of the first gate pattern 101 to the width of the first gate extension pattern 111.

Similarly, the standard cell template may further include a second gate extension pattern 112. The second gate extension pattern 112 is located in the second well region II and is connected to an end of the second gate pattern 102, for defining a second gate extension structure. In the second direction X, the width of the second gate extension pattern 112 is greater than that of the second gate pattern 102. The effect of the second gate extension pattern 112 may be referred to the corresponding description of the first gate extension pattern 111, which will not be repeated here.

It should be noted that in other embodiments, the standard cell template may not be provided with the first gate extension pattern and the second gate extension pattern.

Since the gate electrical connection structure defined by the gate electrical connection pattern 103 is arranged on the same layer as the first gate and the second gate, when the gate electrical connection structure is electrically connected to the first gate and/or the second gate structure, there is no need to provide a contact hole structure with a large resistance. This shortens the electrical connection path and avoids excessive resistance caused by the contact hole structure, thereby reducing the power consumption and RC effect of the circuit structure corresponding to the standard cell template. When the circuit structure is applied to a memory, the power consumption of the memory is reduced and the storage speed is increased.

In addition, the material of the gate electrical connection structure may be the same as that of the first gate and the second gate. In this way, the manufacturing process of the first gate and the second gate can also be used to manufacture the gate electrical connection structure at the same time, so as to reduce the manufacturing steps and reduce the production cost. In addition, when the first gate and the second gate are made of polysilicon, the gate electrical connection structure is also made of polysilicon. Generally, the resistivity of polysilicon is less than that of a metal such as copper. Therefore, the gate electrical connection structure made of polysilicon can reduce the resistance.

In this embodiment, the gate electrical connection pattern 103 includes: at least two electrical connection patterns which are arranged at interval. Each of the electrical connection patterns extends along the second direction X, which is different from the first direction Y, and each of the electrical connection patterns is used to define an electrical connection structure. The second direction X may be perpendicular to the first direction Y. It is understandable that, in other embodiments, provided that the requirements of the LDR and DRC are satisfied, the angle between the second direction and the first direction may also be in other suitable range.

Correspondingly, the gate electrical connection structure includes at least two electrical connection structures which are arranged at interval, which increases the number of specific circuits to which the standard cell template is applicable and expands the application scenarios of the standard cell template.

The at least two electrical connection patterns which are arranged at interval include: a first electrical connection pattern 113, located in the first well region I, for defining a first electrical connection structure to electrically connect the first gate; and a second electrical connection pattern 123, located in the second well region II, for defining a second electrical connection structure to electrically connect the second gate. Since the first electrical connection pattern 113 is located in the first well region I, the distance between the first electrical connection structure and the first gate is reduced. Therefore, the electrical connection path between the first electrical connection structure and the first gate is shortened, and the resistance on the electrical connection path is reduced. Similarly, since the second electrical connection pattern 123 is located in the second well region II, the resistance on the electrical connection path between the second electrical connection structure and the second gate is reduced.

In this embodiment, the gate electrical connection pattern 103 is located in the intermediate region iii. In this way, the gate electrical connection pattern 103 will not interfere with the layout of the first MOS region i and the second MOS region ii, such that the first active region and the second active region in the corresponding semiconductor structure can have a large width. In other embodiments, if an isolation region is provided between the first well region and the second well region, the gate electrical connection pattern may be provided in the isolation region. It should be noted that in other embodiments, depending on the complexity of the circuit structure to which the standard cell template is applicable, the gate electrical connection pattern may also include three or more electrical connection patterns.

Figure 4:
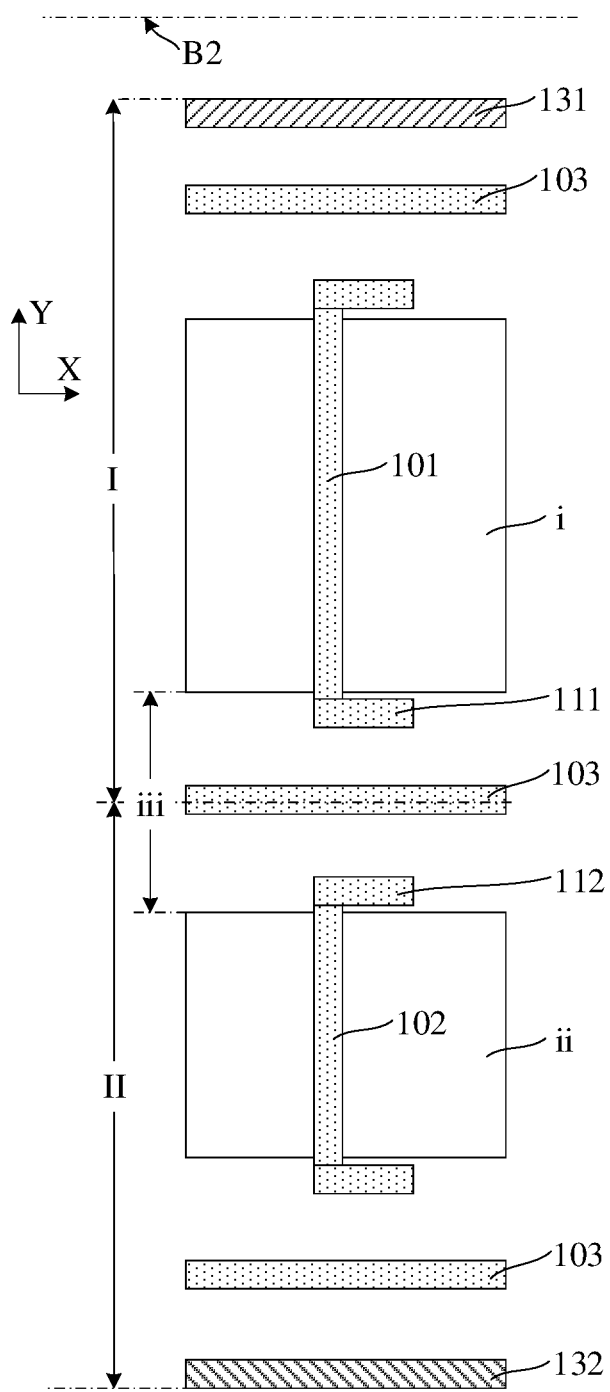
FIG. 4 is a view illustrating a second structure of the standard cell template according to the first embodiment of the present disclosure.

FIG. 4 is a view illustrating a second structure of the standard cell template according to the first embodiment of the present disclosure. It should also be noted that in other embodiments, as shown in FIG. 4, the gate electrical connection pattern 103 may also include one electrical connection pattern, which extends along the second direction X different from the first direction Y. One part of the electrical connection pattern is located in the first well region I, and the rest part of the electrical connection pattern is located in the second well region II. For example, one half of the electrical connection pattern occupies a part of a space of the first well region I, and the other half of the electrical connection pattern occupies a part of a space of the second well region II.

The standard cell template may not design an auxiliary pattern. Instead, the auxiliary layout may be created during a specific layout design. This can expand the application scenarios of the standard cell template, such that the standard cell template is suitable for the electrical connection between the first gate and the second gate, and is also suitable for the electrical connection between the gate electrical connection structure and the first gate structure or the second gate structure. The standard cell template is described below with reference to the design of a specific layout.

In an example, when the standard cell template is used to design a layout, if the specific circuit structure corresponding to the layout is that the first gate and the second gate are electrically connected, then on the basis of the standard cell template, an auxiliary pattern may be additionally designed to define an auxiliary electrical connection structure, such that the gate electrical connection structure is electrically connected to the first gate and the second gate through the auxiliary electrical connection structure. In another example, if the specific circuit structure corresponding to the layout is that the gate electrical connection pattern is electrically connected to the first gate, then on the basis of the standard cell template, an auxiliary pattern may be additionally designed to define an auxiliary electrical connection structure, such that the gate electrical connection structure is electrically connected to the first gate through the auxiliary electrical connection structure.

Figure 5:
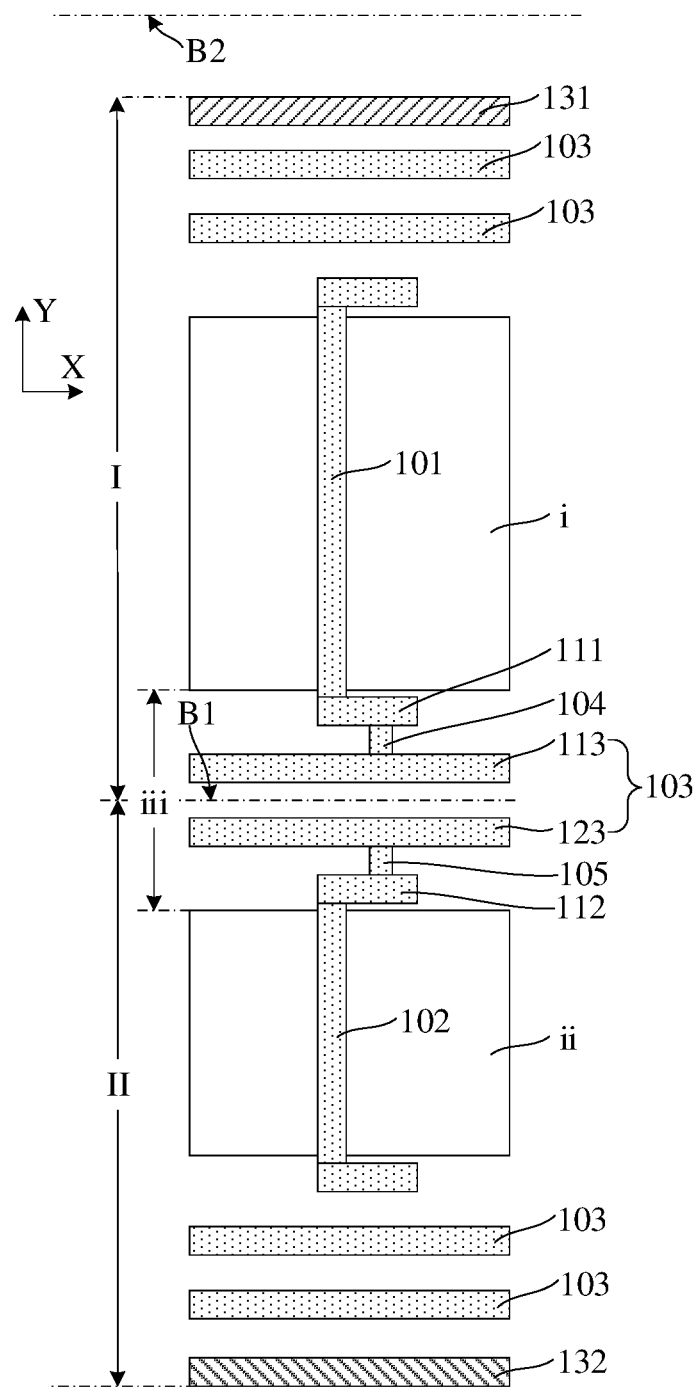
FIG. 5 is a view illustrating a third structure of the standard cell template according to the first embodiment of the present disclosure.

It is understandable that the auxiliary pattern may also be designed in the standard cell template in advance according to the specific circuit structure corresponding to the standard cell template. FIG. 5 is a view illustrating a third structure of the standard cell template according to the first embodiment of the present disclosure. Referring to FIG. 5, the gate electrical connection pattern 103 of the standard cell template may further include: a first auxiliary pattern 104 and a second auxiliary pattern 105. The first auxiliary pattern connects the first gate pattern 101 and an electrical connection pattern facing toward the first gate pattern 101, for defining a first auxiliary electrical connection structure to electrically connect the first gate and an electrical connection structure facing toward the first gate. The second auxiliary pattern connects the second gate pattern 102 and an electrical connection pattern facing toward the second gate pattern 102, for defining a second auxiliary electrical connection structure to electrically connect the second gate and an electrical connection structure facing toward the second gate.

The first auxiliary electrical connection structure is arranged on the same layer as the first gate and/or the second gate, and the first auxiliary electrical connection structure may be made of the same material as the first gate and/or the second gate. The second auxiliary electrical connection structure is arranged on the same layer as the first gate and/or the second gate, and the second auxiliary electrical connection structure may be made of the same material as the first gate and/or the second gate.

Through the layout of the first auxiliary pattern 104, in the specific circuit structure corresponding to the standard cell template, the first gate is electrically connected to the gate electrical connection structure. Through the layout of the second auxiliary pattern 105, in the specific circuit structure corresponding to the standard cell template, the second gate is electrically connected to the gate electrical connection structure. In this way, during the design of a layout using the standard cell template, a layout engineer or an automatic layout tool does not need to additionally design a first auxiliary pattern and a second auxiliary pattern.

Figure 6:
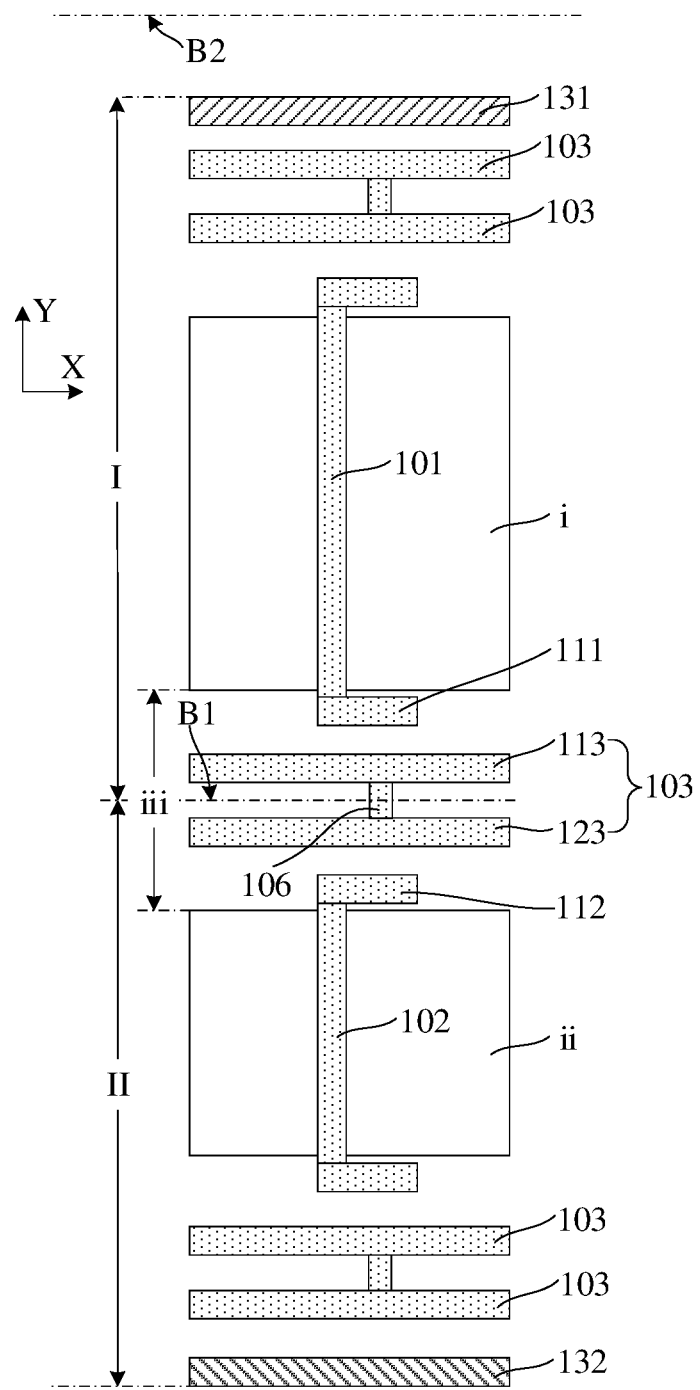
FIG. 6 is a view illustrating a fourth structure of the standard cell template according to the first embodiment of the present disclosure.

FIG. 6 is a view illustrating a fourth structure of the standard cell template according to the first embodiment of the present disclosure. Referring to FIG. 6, the gate electrical connection pattern 103 may further include: a third auxiliary pattern 106 located between adjacent electrical connection patterns, for defining a third auxiliary electrical connection structure to electrically connect the adjacent electrical connection structures. In this way, in the specific circuit corresponding to the standard cell template, the adjacent electrical connection structures are electrically connected. The third auxiliary electrical connection structure may be arranged on the same layer and made of the same material as the first gate and/or the second gate.

In addition, in other embodiments, the gate electrical connection pattern may include the first auxiliary pattern and the second auxiliary pattern, and may also include the third auxiliary pattern.

In this embodiment, as shown in FIG. 3, the gate electrical connection pattern 103 may further be located on a side of the first gate pattern 101 away from the second gate pattern 102 and a side of the second gate pattern 102 away from the first gate pattern 101. In other words, the gate electrical connection pattern 103 may also be designed on the top and bottom of the standard cell template, which expands the application scenarios of the standard cell template and facilitates the use of the standard cell template for a more complex layout design.

The standard cell template may further include: a first well connection pattern 131, located in the first well region I, for defining a first well plug; and a second well connection pattern 132, located in the second well region II, for defining a second well plug. The first well connection pattern 131 is located at an edge of the first well region I away from the second well region II, and the second well connection pattern 132 is located at an edge of the second well region II away from the first well region I.

In this embodiment, in the first direction Y, the standard cell template has a second boundary B2 away from the second well region II. When the standard cell template is used for a layout design, two circuit layouts may be axisymmetric with respect to the second boundary B2. The two circuit layouts share the second boundary B2. A boundary of the first well region I of one circuit layout toward the second boundary B2 is defined as a third boundary, and a boundary of the first well region I of the other circuit layout toward the second boundary B2 is defined as a fourth boundary. The second boundary B2 is located in a middle position between the third boundary and the fourth boundary.

The standard cell templates may be designed based on the LDR. For example, the height of each standard cell template is the same, and each standard cell template includes all design rules and routing guidelines. It is necessary to consider the boundaries of different standard cell templates so as to ensure that the standard cell templates can pass the DRC and Layout Versus Schematics (LVS) when placed together. In order to facilitate block level routing, it is also necessary to consider the input/output locations of the standard cell template.

In addition, the standard cell template may also be designed by considering a P/N ratio and a standard cell delay parameter (tPD).

The standard cell template provided by this embodiment can be used for layout engineers to design layouts. The gate electrical connection pattern is designed in the standard cell template, and the gate electrical connection pattern is used to define a gate electrical connection structure arranged on the same layer as the first gate and/or the second gate. Therefore, the electrical connection between the gate electrical connection structure and the first gate and/or the second gate can be utilized. There is no need to provide a contact hole structure to implement the electrical connection of upper and lower layers, thereby reducing the resistance of the electrical connection path of the corresponding semiconductor structure, and reducing the power consumption and the RC delay effect of the circuit structure corresponding to the semiconductor structure.

In addition, the standard cell template provided by this embodiment does not need to reserve a space for defining a pattern layer (i.e. M0) electrically connected to the first gate and/or the second gate, thereby reducing the area of the circuit layout designed by using the standard cell template, for example, reducing the area of a logic region in the circuit layout. In addition, when using the standard cell template to design a layout, a layout engineer can minimize the area of the pattern layer electrically connected to the first gate and/or the second gate, thereby reducing the load of the circuit structure corresponding to the layout. Meanwhile, the standard cell template may be used as a layout design template for other chip such as a DRAM, making the corresponding circuit layout more regular. Different circuit layouts follow a consistent rule so as to optimize layout design, improve layout design efficiency, and shorten chip design time.

A second embodiment of the present disclosure further provides a standard cell template. The standard cell template is substantially the same as that provided by the first embodiment, and a main difference lies in that a power pattern is further designed. The standard cell template provided by the second embodiment of the present disclosure is described in detail below with reference to the drawings. It should be noted that the parts the same as or corresponding to those mentioned in the first embodiment may be referred to the first embodiment and will not be repeated here.

Figure 7:
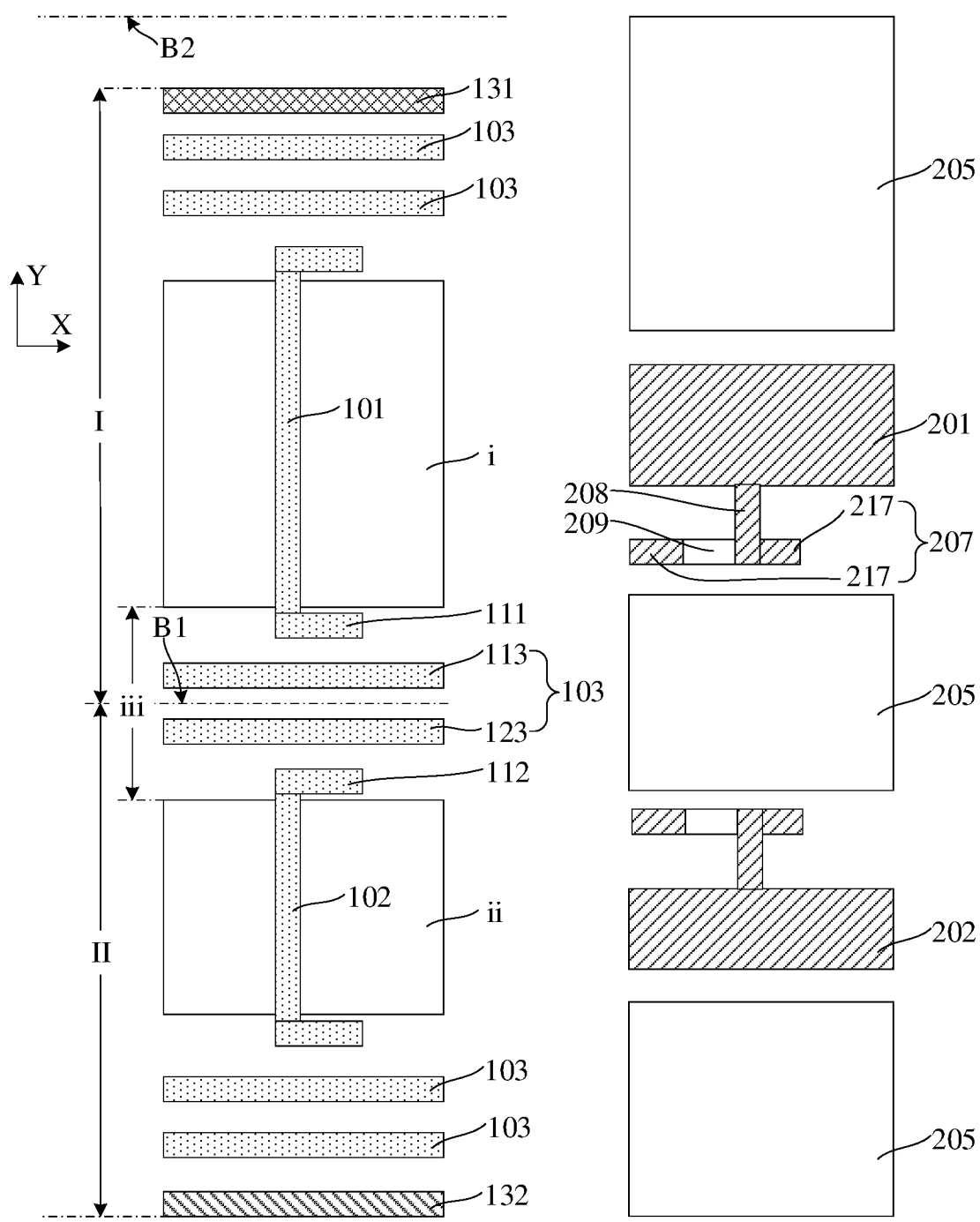
FIG. 7 is a view illustrating a first structure of a standard cell template according to a second embodiment of the present disclosure.
Figure 8:
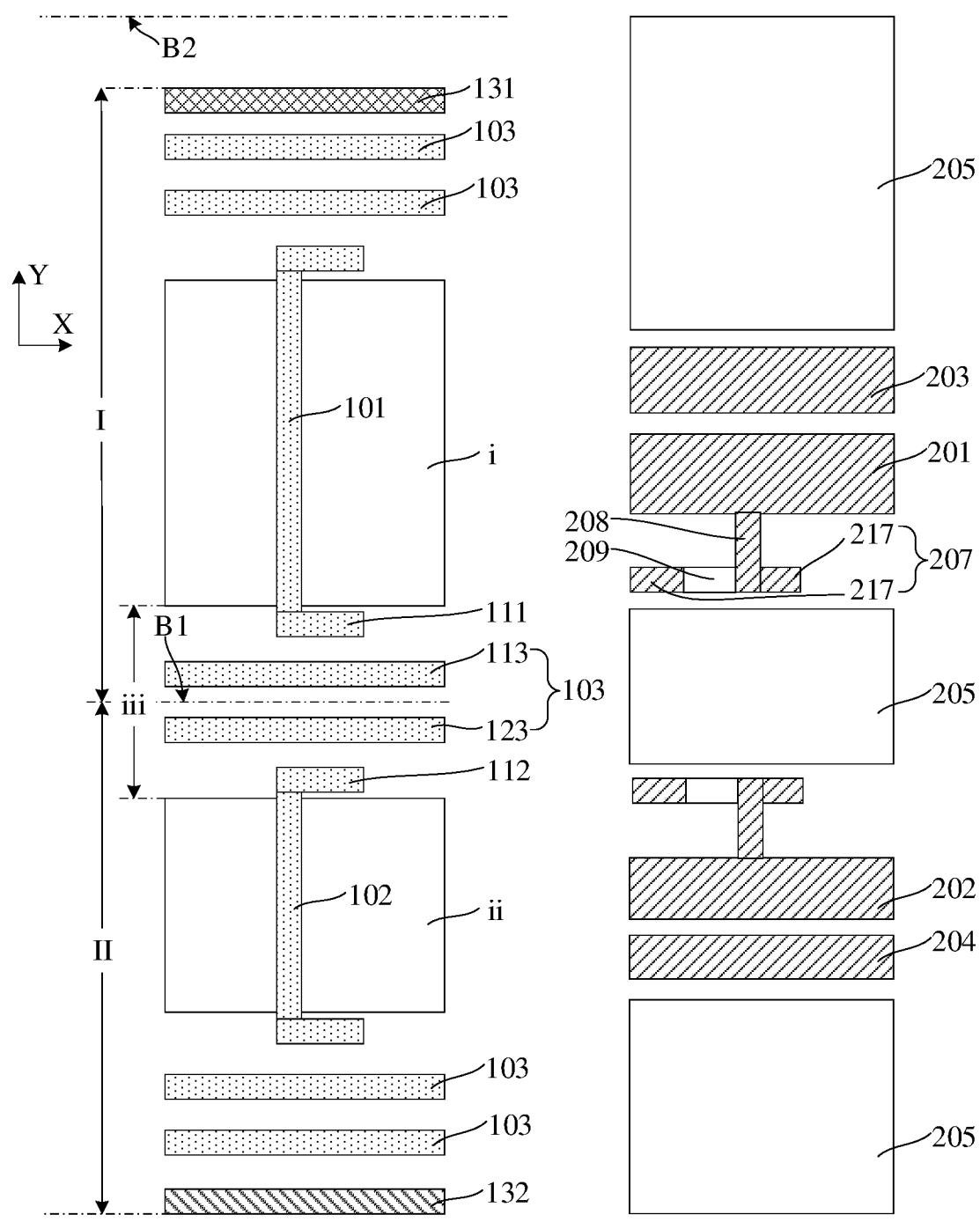
FIG. 8 is a view illustrating a second structure of the standard cell template according to the second embodiment of the present disclosure.

FIG. 7 is a view illustrating a first structure of the standard cell template according to the second embodiment of the present disclosure; and FIG. 8 is a view illustrating a second structure of the standard cell template according to the second embodiment of the present disclosure.

The standard cell template shown in FIG. 7 is applicable to a high-speed memory, and the standard cell template shown in FIG. 8 is applicable to a low-power memory.

Referring to FIGS. 7 and 8, in this embodiment, the standard cell template further includes: a first power pattern 201, for defining a first power line, which is used to connect a first power supply; and a second power pattern 202, for defining a second power line, which is used to connect a second power supply. The voltage of the first power supply is greater than that of the second power supply. In the first direction Y, the width of the first power pattern 201 is greater than that of the second power pattern 202.

The first well region I defines a well of a PMOS transistor, and the second well region II defines a well of an NMOS transistor. Since the width ratio of the PMOS transistor to the NMOS transistor is generally 2:1, the first power line used for powering the PMOS transistor is wider than the second power line used for powering the NMOS transistor.

In an example, as shown in FIG. 8, the standard cell template may include: a third power pattern 203, for defining a third power line, which is used to connect a third power supply; and a fourth power pattern 204, for defining a fourth power line, which is used to connect a fourth power supply. The voltage of the third power supply is greater than that of the fourth power supply. In the first direction Y, the width of the third power pattern 203 is greater than that of the fourth power pattern 204.

The standard cell template may further include: signal line patterns 205 for defining signal lines. There are at least two signal line patterns 205, of which one signal line pattern 205 corresponds to the first well region I, and the other signal line pattern 205 corresponds to the second well region II. Multiple signal lines may be arranged in a corresponding region of each of the signal line patterns 205.

When the standard cell template is used to design a layout, if the corresponding circuit structure requires at least two high-level power supplies, at least two adjacent signal lines defined by the signal line pattern 205 in the corresponding region may be combined to serve as a power line to connect a second high-level power supply. In this way, circuit layouts working in different power domains can be placed in the same row, that is, they can be arranged next to each other. The power line of a first high-level power supply is defined by the first power pattern 201, and the power line of the second high-level power supply is composed of at least two adjacent signal lines defined by the signal line pattern 205 in the corresponding region. Therefore, the power lines of these two power supplies do not run on the same track, thereby avoiding short circuits and expanding the application scenarios of standard cell template.

In addition, a metal switch pattern may further be provided in the standard cell template, and the standard cell template is suitable for the following two application scenarios through the metal switch pattern:

1. The metal switch pattern is connected to the power line, and other circuit structure connected to a structure defined by the metal switch pattern is connected to a power supply, thereby realizing a first circuit function. 2. The metal switch pattern is connected to a signal line, and other circuit structure connected to a structure defined by the metal switch pattern is connected to the signal line, thereby realizing a second circuit function.

The standard cell template includes: a power pattern, for defining a power line, which is used to connect a power supply; a signal pattern 207, for defining a signal line; a first gating pattern 208, for defining a first gating switch, which is used to implement electrical connection or disconnection of the power line; and a second gating pattern 209, for defining a second gating switch, which is used to implement electrical connection or disconnection of the signal line. The signal pattern 207, the first gating pattern 208 and the second gating pattern 209 are located on the same side of the power pattern.

The power pattern may include at least one of the first power pattern 201 and the second power pattern 202. The first gating pattern 208 and the second gating pattern 209 define the metal switch pattern, and one of the first gating pattern 208 and the second gating pattern 209 participates in actual routing. For example, if the first gating pattern 208 participates in routing and the second gating pattern 209 does not participate in routing, the first gating switch is connected to the power line and the second gating switch is turned off. If the first gating pattern 208 does not participate in routing and the second gate pattern 209 participates in routing, the first gating switch is turned off and the second gating switch is connected to the signal line.

In this embodiment, the signal pattern 207 includes two sub-signal patterns 217 arranged in a third direction. There is an interval between the two sub-signal patterns 217. The first gating pattern 208 is connected to one of the sub-signal patterns 217, and the first gating pattern 208 is located between the sub-signal pattern 217 and the power pattern. The second gating pattern 209 is located between the two sub-signal patterns 217. In a direction parallel to the third direction, the length of the second gating pattern 209 is greater than or equal to that of the interval. The third direction may be the same as the second direction X.

It is understandable that, in other embodiments, the signal pattern may also include only a single sub-gating pattern.

In this embodiment, the application scenarios of the standard cell template are expanded by rationally arranging the power pattern, the signal pattern, the first gating pattern and the second gating pattern. In an actual chip design, the actual layout may be adjusted redundantly according to the standard cell template. For example, the first gating pattern or the second gating pattern may be used to change the circuit structure corresponding to the layout, thereby adjusting the delay parameter corresponding to the circuit structure.

Figure 9:
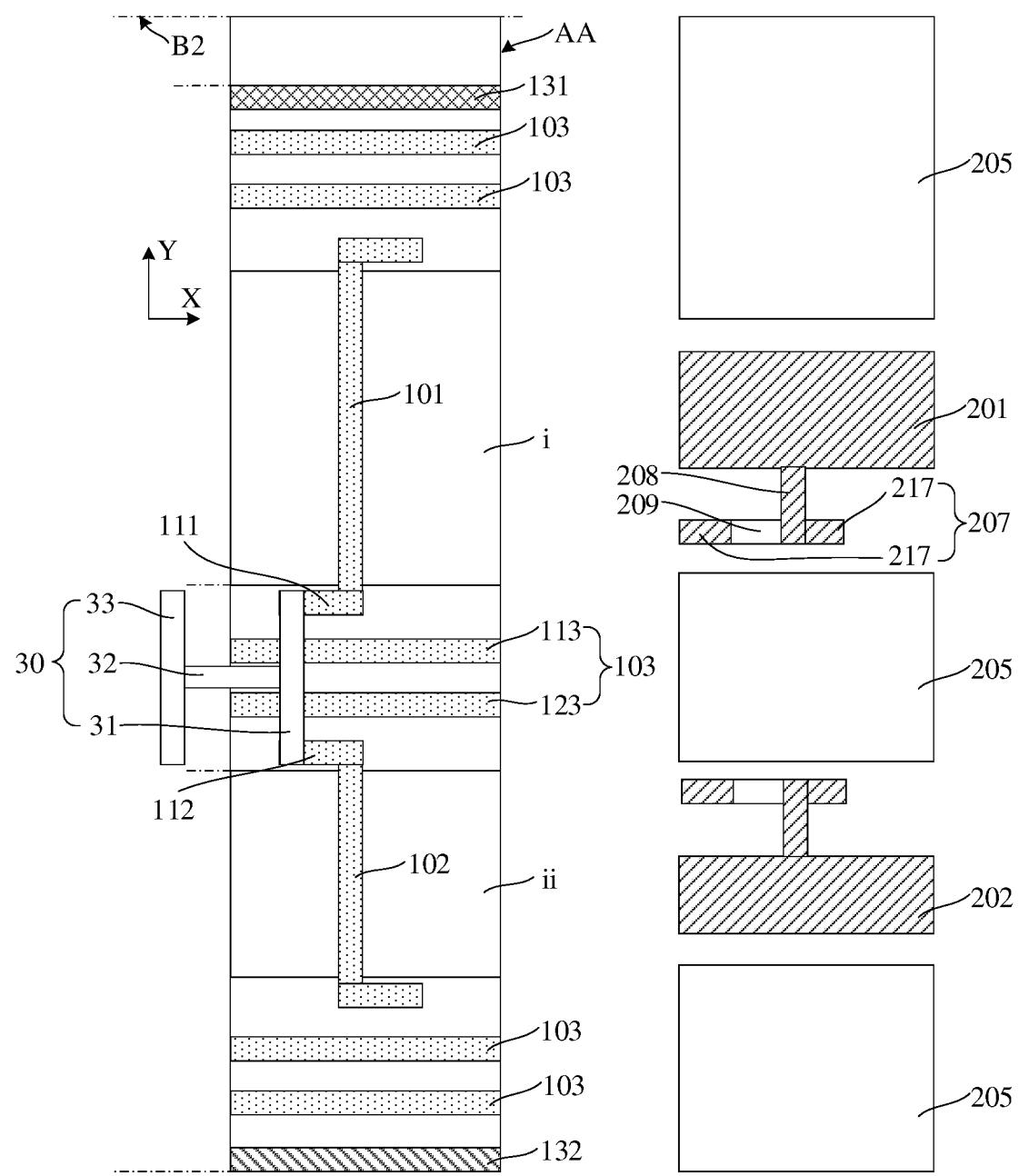
FIG. 9 is a view illustrating a structure of a standard cell template according to a third embodiment of the present disclosure.

A third embodiment of the present disclosure further provides a standard cell template. This embodiment is substantially the same as the previous embodiment, except for a main difference below. The standard cell template provided by the previous embodiment is applicable for manual routing via custom layout, but the standard cell template provided by the third embodiment is applicable for automatic routing, that is, a full-chip physical design via auto-place route (auto-PR) can be used to create a layout through the standard cell template. FIG. 9 is a view illustrating a structure of the standard cell template according to the third embodiment of the present disclosure.

The standard cell template provided by the third embodiment of the present disclosure is described in detail below with reference to the drawings. It should be noted that the parts the same as or corresponding to those mentioned in the previous embodiment will not be repeated here.

Referring to FIG. 9, in this embodiment, the standard cell template further includes: a metal layer pattern 30. The metal layer pattern 30 spans the gate electrical connection pattern 103, the first gate pattern 101 and/or the second gate pattern 102, for defining a metal layer. The metal layer is located on an upper layer of the first gate and an upper layer of the second gate, to electrically connect the first gate and/or the second gate.

It should be noted that if the standard cell template further includes a first gate extension pattern 111 and a second gate extension pattern 112, the metal layer pattern 30 spans the gate electrical connection pattern 103, the first gate pattern 101 and/or the second gate pattern 102. That is, the metal layer pattern 30 spans the gate electrical connection pattern 103, the first gate extension pattern 111 and/or the second gate extension pattern 112.

The metal layer provides a condition for automatic routing. In this embodiment, for example, if the metal layer is electrically connected to the first gate and the second gate, the metal layer pattern 30 spans the first gate extension pattern 111, the gate electrical connection pattern 103 and the second gate extension pattern 112. It is understandable that if the metal layer is only electrically connected to the first gate, a contact hole structure is correspondingly provided in an overlapping region of the metal layer pattern 30 and the gate electrical connection pattern 103, and the gate electrical connection structure defined by the gate electrical connection pattern 103 is electrically connected to the first gate. If the metal layer is only electrically connected to the second gate, a contact hole structure is correspondingly provided in an overlapping region of the metal layer pattern 30 and the gate electrical connection pattern 103, and the gate electrical connection structure defined by the gate electrical connection pattern 103 is electrically connected to the second gate.

The standard cell template has a custom layout region AA. The first well region I and the second well region II are located in the custom layout region AA. One part of the metal layer pattern 30 is located in the custom layout region AA, and the rest part thereof is located outside the custom layout region AA.

The metal layer pattern 30 includes: a first metal layer pattern 31, a second metal layer pattern 32 and a third metal layer pattern 33. The first metal layer pattern 31 extends along the first direction Y, and has an overlap with the gate electrical connection pattern 103, the first gate extension pattern 111 and/or the second gate extension pattern 112. The second metal layer pattern is connected to the first metal layer pattern 31 and extends along the second direction X to the outside of the custom layout region AA. The third metal layer pattern is located outside the custom layout region AA and is connected to the second metal layer pattern 32. The third metal layer pattern 33 extends along the first direction Y.

It should be noted that, in other embodiments, if the standard cell template does not design the first gate extension pattern and the second gate extension pattern, the metal layer pattern spans the gate electrical connection pattern, the first gate pattern and/or the second gate pattern. That is, the metal layer pattern has an overlap with the first gate pattern and/or the second gate pattern.

The standard cell template provided by this embodiment provides a condition for achieving automated layout by designing the metal layer pattern.

Figure 10:
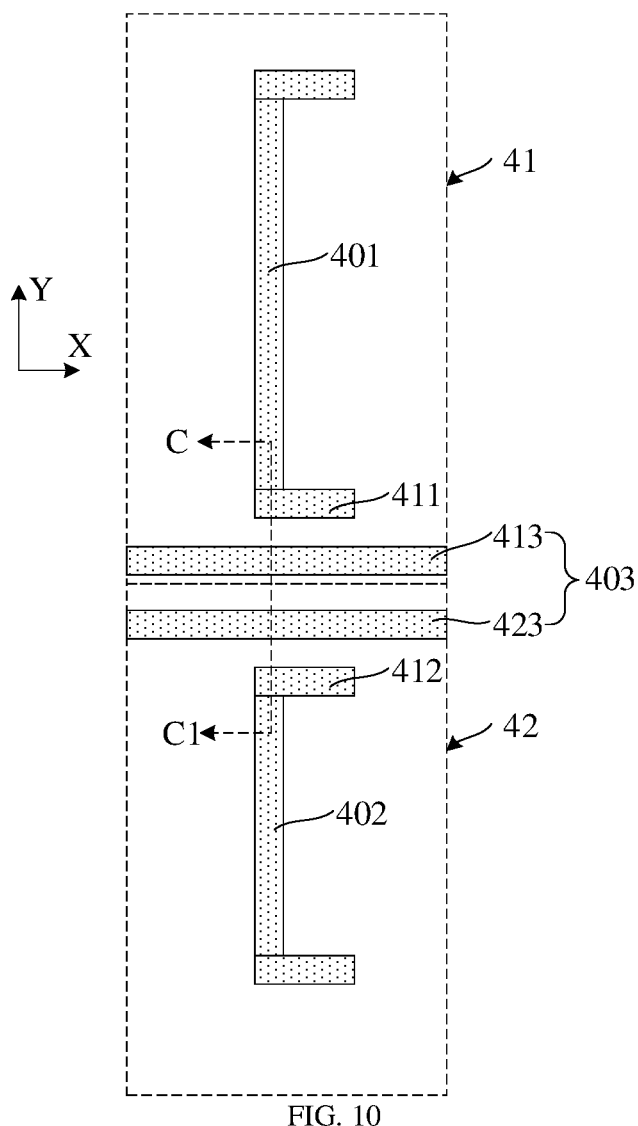
FIG. 10 is a top view illustrating a structure of a semiconductor structure according to a fourth embodiment of the present disclosure.

A fourth embodiment of the present disclosure further provides a semiconductor structure, which may be fabricated by using the standard cell template provided by the above embodiments. FIG. 10 is a top view illustrating a structure of a semiconductor structure according to a fourth embodiment of the present disclosure; and FIG. 11 is a sectional view illustrating a structure in CC1 in FIG. 10.

Figure 11:
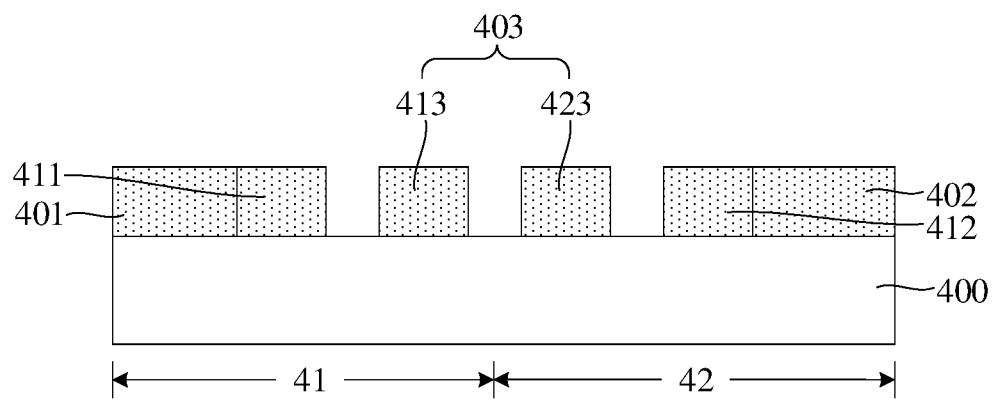
FIG. 11 is a first sectional view illustrating a structure along CC1 in FIG. 10.

Referring to FIGS. 10 and 11, in this embodiment, the semiconductor structure includes: a substrate 400, where the substrate 400 is provided therein with a first well 41 and a second well 42 that are arranged along a first direction; a first gate 401, located on the substrate 400 where the first well 41 is located and extending along the first direction Y; a second gate 402, located on the substrate 400 where the second well 42 is located and extending along the first direction Y; and a gate electrical connection structure 403, located on the substrate 400 and arranged on the same layer as the first gate 401 and the second gate 402 to electrically connect the first gate 401 and/or the second gate 402.

The semiconductor structure may be a memory such as a DRAM, an SRAM, an MRAM, a FeRAM, a PCRAM, an HBM, an NAND flash memory or an NOR flash memory.

The gate electrical connection structure 403 is on the same layer as the first gate 401 and the second gate 402. Therefore, the electrical connection between the gate electrical connection structure 403 and the first gate 401 or the second gate 402 can be implemented without providing a contact hole structure to implement the electrical connection of the upper and lower layers. Compared with a solution in which the gate electrical connection structure is located above the first gate and the second gate, this embodiment shortens the electrical connection path between the gate electrical connection structure 403 and the first gate 401, and shortens the electrical connection path between the gate electrical connection structure 403 and the second gate 402. Therefore, this embodiment reduces the resistance corresponding to the electrical connection path, and reduces the power consumption and the RC delay effect of the semiconductor structure.

For example, in the step of forming the first gate 401 and/or the second gate 402, the gate electrical connection structure 403 may be formed at the same time. Correspondingly, the top of the gate electrical connection structure 403 may be flush with the top of the first gate 401 and the top of the second gate 402. In addition, the bottom of the gate electrical connection structure 403 may also be flush with the bottom of the first gate 401 and the bottom of the second gate 402. In this way, the gate electrical connection structure 403 has a large thickness, thereby reducing the overall resistance of the gate electrical connection structure 403, and reducing the power consumption and the RC delay effect of the semiconductor structure. It is understandable that the "top" herein refers to a top surface away from the substrate 400, and the 'bottom' herein refers to a bottom surface facing toward the substrate 400.

In addition, in this embodiment, the material of the gate electrical connection structure 403 may also be the same as that of the first gate 401 and the second gate 402. In a specific example, the gate electrical connection structure 403, the first gate 401 and the second gate 402 are all made of polysilicon. Generally, the resistivity of polysilicon is less than that of a metal. For example, the resistivity of polysilicon is less than that of copper. Therefore, the gate electrical connection structure 403 made of polysilicon reduces the resistance of the electrical connection path, thereby reducing the power consumption of the semiconductor structure.

In this embodiment, the semiconductor structure may further include: a first auxiliary gate 411, connected to an end of the first gate 401 and extending along a second direction X; and a second auxiliary gate 412, connected to an end of the second gate 402 and extending along the second direction X. The first auxiliary gate 411 and the first gate 401 are arranged on the same layer and made of the same material, and the second auxiliary gate 412 and the second gate 402 are arranged on the same layer and made of the same material. In the second direction X, the width of the first auxiliary gate 411 is greater than that of the first gate 401, and the width of the second auxiliary gate 412 is greater than that of the second gate 402. The first auxiliary gate 411 adds a process window for electrically connecting the first gate 401 and the gate electrical connection structure 403, and the second auxiliary gate 412 adds a process window for electrically connecting the second gate 402 and the gate electrical connection structure 403. In this way, the alignment accuracy of the process is reduced, and the manufacturing difficulty of the semiconductor structure is reduced.

In this embodiment, the gate electrical connection structure 403 includes at least two electrical connection structures. Each of the electrical connection structures extends along the second direction X, which is different from the first direction Y.

The at least two electrical connection structures include: a first electrical connection structure 413 and a second electrical connection structure 423. The first electrical connection structure 413 is located on the substrate 400 where the first well 41 is located, and is arranged on the same layer as the first gate 401 and the second gate 402. The second electrical connection structure is located on the substrate 400 where the second well 42 is located, and the second electrical connection structure 423 is arranged on the same layer as the first gate 401 and the second gate 402.

The first electrical connection structure 413 may be used to electrically connect the first gate 401 through the first auxiliary gate 411, and the second electrical connection structure 423 may be used to electrically connect the second gate 402 through the second auxiliary gate 412.

Figure 12:
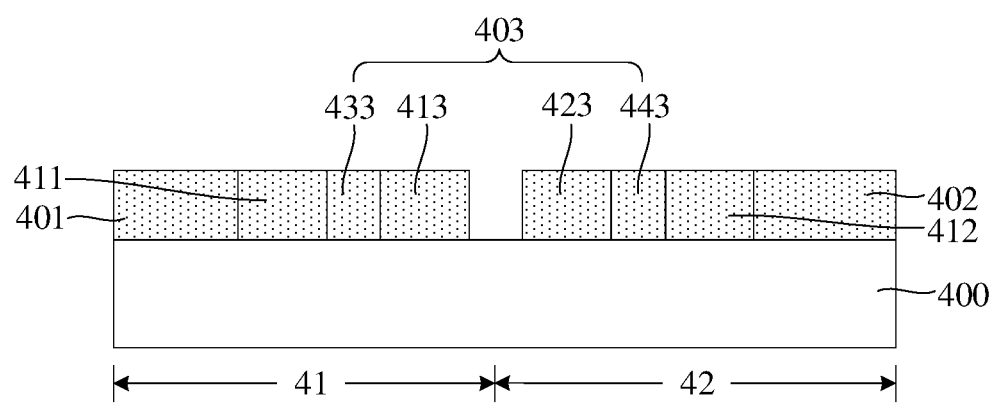
FIG. 12 is a second sectional view illustrating a structure of the semiconductor structure according to the fourth embodiment of the present disclosure.

FIG. 12 is a second sectional view illustrating a structure of the semiconductor structure according to the fourth embodiment of the present disclosure.

Referring to FIG. 12, the gate electrical connection structure 403 may further include: a first auxiliary electrical connection structure 433 and a second auxiliary electrical connection structure 443. The first auxiliary electrical connection structure is located between the first gate 401 and an electrical connection structure facing toward the first gate 401 to electrically connect the first gate 401 and the electrical connection structure facing toward the first gate 401. The second auxiliary electrical connection structure is located between the second gate 402 and an electrical connection structure facing toward the second gate 402 to electrically connect the second gate 402 and the electrical connection structure facing toward the second gate.

The first auxiliary electrical connection structure 433 is in contact with and electrically connected to the first electrical connection structure 413 and the first auxiliary gate 411. The second auxiliary electrical connection structure 443 is in contact with and electrically connected to the second electrical connection structure 423 and the second auxiliary gate 412.

The first auxiliary electrical connection structure 433 and the second auxiliary electrical connection structure 443 are on the same layer as the first gate 401 and the second gate 402.

Figure 13:
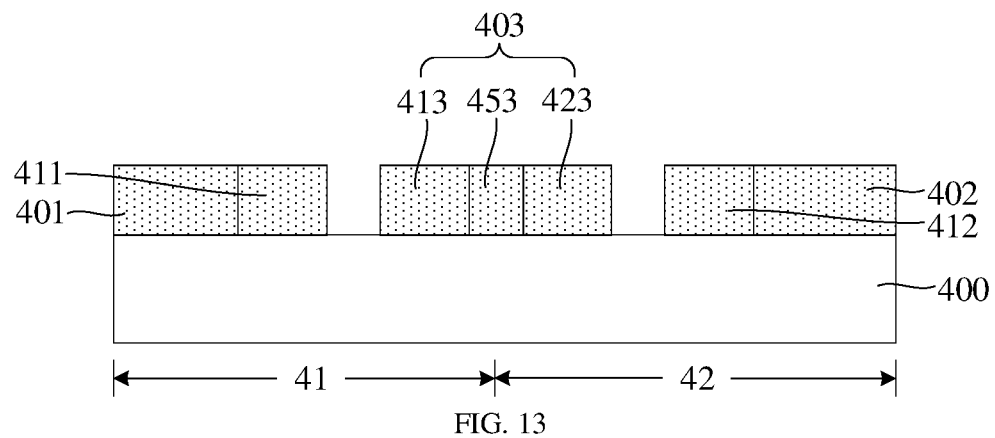
FIG. 13 is a third sectional view illustrating a structure of the semiconductor structure according to the forth embodiment of the present disclosure.

FIG. 13 is a third sectional view illustrating a structure of the semiconductor structure according to the forth embodiment of the present disclosure.

Referring to FIG. 13, in this embodiment, the gate electrical connection structure 403 may further include: a third auxiliary electrical connection structure 453, located between adjacent electrical connection structures to electrically connect the adjacent electrical connection structures. In this way, the specific circuit structure corresponding to the semiconductor structure is that adjacent electrical connection structures are electrically connected to each other.

It is understandable that in other embodiments, the gate electrical connection structure may also include only one electrical connection structure, and according to the specific circuit structure corresponding to the semiconductor structure, the electrical connection structure may be electrically connected to the first gate. Alternatively, the electrical connection structure may be electrically connected to the second gate. Alternatively, the electrical connection structure may be electrically connected to the first gate and the second gate.

In the technical solution of the semiconductor structure provided by this embodiment, the electrical connection of the first gate 401 and/or the second gate 402 may be achieved through the gate electrical connection structure 403 arranged on the same layer. The electrical connection path is reduced, and there is no need to provide a contact hole structure with a large resistance. Therefore, the resistance of the semiconductor structure is reduced, and the power consumption and the RC delay effect of the semiconductor structure are reduced. Since the semiconductor structure is a memory, the storage speed of the memory can also be improved.

The embodiments or implementations of this specification are described in a progressive manner, and each embodiment focuses on differences from other embodiments. The same or similar parts between the embodiments may refer to each other.

In the description of the specification, the description with reference to terms such as "an embodiment", "an illustrative embodiment", "some implementations", "an illustrative implementation" and "an example" means that the specific feature, structure, material or feature described in combination with the implementation(s) or example(s) is included in at least one implementation or example of the present disclosure.

In this specification, the schematic expression of the above terms does not necessarily refer to the same implementation or example. Moreover, the described specific feature, structure, material or characteristic may be combined in an appropriate manner in any one or more implementations or examples.

It should be noted that in the description of the present disclosure, the terms such as "center", "top", "bottom", "left", "right", "vertical", "horizontal", "inner" and "outer" indicate the orientation or position relationships based on the drawings. These terms are merely intended to facilitate description of the present disclosure and simplify the description, rather than to indicate or imply that the mentioned device or element must have a specific orientation and must be constructed and operated in a specific orientation. Therefore, these terms should not be construed as a limitation to the present disclosure.

It can be understood that the terms such as "first" and "second" used in the present disclosure can be used to describe various structures, but these structures are not limited by these terms. Instead, these terms are merely intended to distinguish one element from another.

The same elements in one or more drawings are denoted by similar reference numerals. For the sake of clarity, various parts in the drawings are not drawn to scale. In addition, some well-known parts may not be shown. For the sake of brevity, the structure obtained by implementing multiple steps may be shown in one figure. In order to make the understanding of the present disclosure more clearly, many specific details of the present disclosure, such as the structure, material, size, processing process and technology of the device, are described below. However, as those skilled in the art can understand, the present disclosure may not be implemented according to these specific details.

Finally, it should be noted that the above embodiments are merely intended to explain the technical solutions of the present disclosure, rather than to limit the present disclosure. Although the present disclosure is described in detail with reference to the above embodiments, those skilled in the art should understand that they may still modify the technical solutions described in the above embodiments, or make equivalent substitutions of some or all of the technical features recorded therein, without deviating the essence of the corresponding technical solutions from the scope of the technical solutions of the embodiments of the present disclosure.

INDUSTRIAL APPLICABILITY

The embodiments of the present disclosure provide a standard cell template and a semiconductor structure. The electrical connection of a first gate and/or a second gate is implemented by a gate electrical connection structure on the same layer as the first gate and the second gate, which reduces the length of an electrical connection path and reduces the corresponding resistance of the electrical connection path. In addition, there is no need to provide a contact hole structure to implement the electrical connection of upper and lower layers, thereby avoiding the adverse effect caused by the contact hole structure with a large resistance, and reducing the corresponding resistance of the electrical connection path. Therefore, the semiconductor structure fabricated by using the standard cell template provided by the embodiment of the present disclosure has fast operating speed, low power consumption and good signal quality. For example, the signal quality in terms of signal delay, signal rise time and/or signal fall time on the gate are improved. In addition, the standard cell template provided by the embodiment of the present disclosure can be used as a circuit design template for a DRAM or other chip. The design of the gate electrical connection pattern achieves a more regular circuit layout, and different layouts follow a consistent rule. Due to the optimized circuit design, the efficiency of layout design is improved and the time for chip design is shortened.

The invention claimed is:

1. A standard cell template, comprising:
    a first well region and a second well region, arranged along a first direction;
    a first gate pattern, located in the first well region and extending along the first direction, for defining a first gate;
    a second gate pattern, located in the second well region and extending along the first direction, for defining a second gate; and
    a gate electrical connection pattern, located between the first gate pattern and the second gate pattern, for defining a gate electrical connection structure; wherein the gate electrical connection structure is arranged on a same layer as the first gate and the second gate, to electrically connect at least one of the first gate or the second gate;

wherein a top surface of the gate electrical connection structure is flush with a top surface of the first gate and a top surface of the second gate, and a bottom surface of the gate electrical connection structure is flush with a bottom surface of the first gate and a bottom surface of the second gate, and a direction pointing from the bottom surface of the gate electrical connection structure to the top surface of the gate electrical connection structure is perpendicular to the first direction.

2. The standard cell template according to claim 1, wherein the gate electrical connection pattern comprises:

at least two electrical connection patterns which are arranged at interval; each of the at least two electrical connection patterns extends along a second direction, the second direction is different from the first direction, and each of the at least two electrical connection patterns is used to define an electrical connection structure.

3. The standard cell template according to claim 2, wherein the at least two electrical connection patterns which are arranged at interval comprises:

a first electrical connection pattern, located in the first well region, for defining a first electrical connection structure to electrically connect the first gate; and a second electrical connection pattern, located in the second well region, for defining a second electrical connection structure to electrically connect the second gate.

4. The standard cell template according to claim 2, wherein the gate electrical connection pattern further comprises:

a first auxiliary pattern, connecting the first gate pattern and an electrical connection pattern facing toward the first gate pattern, for defining a first auxiliary electrical connection structure to electrically connect the first gate and an electrical connection structure facing toward the first gate; and a second auxiliary pattern, connecting the second gate pattern and an electrical connection pattern facing toward the second gate pattern, for defining a second auxiliary electrical connection structure to electrically connect the second gate and an electrical connection structure facing toward the second gate.

5. The standard cell template according to claim 2, wherein the gate electrical connection pattern further comprises:

a third auxiliary pattern, located between adjacent electrical connection patterns of the at least two electrical connection patterns, for defining a third auxiliary electrical connection structure to electrically connect adjacent electrical connection structures.

6. The standard cell template according to claim 1, wherein the gate electrical connection pattern comprises one electrical connection pattern; and the electrical connection pattern extends along a second direction, the second direction is different from the first direction.

7. The standard cell template according to claim 6, wherein a part of the electrical connection pattern is located in the first well region, and a remaining part of the electrical connection pattern is located in the second well region.

8. The standard cell template according to claim 1, wherein the gate electrical connection pattern is further located on a side of the first gate pattern away from the second gate pattern and a side of the second gate pattern away from the first gate pattern.

9. The standard cell template according to claim 1, further comprising:

a metal layer pattern, wherein the metal layer pattern spans at least one of the gate electrical connection pattern, the first gate pattern or the second gate pattern, for defining a metal layer; and the metal layer is located on an upper layer of the first gate and an upper layer of the second gate, to electrically connect at least one of the first gate or the second gate.

10. The standard cell template according to claim 1, wherein the first well region comprises a first metal oxide semiconductor (MOS) region, and the first gate pattern spans the first MOS region;

the second well region comprises a second MOS region, and the second gate pattern spans the second MOS region; and the standard cell template further comprises an intermediate region, the intermediate region is located between the first MOS region and the second MOS region, wherein the gate electrical connection pattern is located in the intermediate region.

11. The standard cell template according to claim 10, wherein the first well region has a first boundary facing toward the second well region, and the first boundary is located in a middle of the intermediate region.

12. The standard cell template according to claim 1, further comprising:

a first power pattern, for defining a first power line, the first power line being used to connect a first power supply; and a second power pattern, for defining a second power line, the second power line being used to connect a second power supply, wherein a voltage of the first power supply is greater than a voltage of the second power supply;

wherein, in the first direction, a width of the first power pattern is greater than a width of the second power pattern.

13. The standard cell template according to claim 1, further comprising:

a power pattern, for defining a power line, the power line being used to connect a power supply;

a signal pattern, for defining a signal line, the signal line being used to connect a signal;

a first gating pattern, for defining a first gating switch, the first gating switch being used to implement electrical connection or disconnection of the power line; and a second gating pattern, for defining a second gating switch, the second gating switch being used to implement electrical connection or disconnection of the signal line;

wherein the signal pattern, the first gating pattern and the second gating pattern are located on a same side of the power pattern.

14. A semiconductor structure, comprising:

a substrate, wherein the substrate is provided with a first well and a second well, the first well and the second well are arranged along a first direction;

a first gate, located on the substrate where the first well is located, and extending along the first direction;

a second gate, located on the substrate where the second well is located, and extending along the first direction; and a gate electrical connection structure, located on the substrate, and arranged on a same layer as the first gate and the second gate to electrically connect at least one of the first gate or the second gate;

wherein a top surface of the gate electrical connection structure is flush with a top surface of the first gate and a top surface of the second gate, and a bottom surface of the gate electrical connection structure is flush with a bottom surface of the first gate and a bottom surface of the second gate, and a direction pointing from the bottom surface of the gate electrical connection structure to the top surface of the gate electrical connection structure is perpendicular to the first direction.

15. The semiconductor structure according to claim 14, wherein the gate electrical connection structure comprises:

at least two electrical connection structures, wherein each of the at least two electrical connection structures extends along a second direction, the second direction is different from the first direction.

16. The semiconductor structure according to claim 15, wherein the at least two electrical connection structures comprise:

a first electrical connection structure, located on the substrate where the first well is located; and a second electrical connection structure, located on the substrate where the second well is located.

17. The semiconductor structure according to claim 15, wherein the gate electrical connection structure further comprises:

a first auxiliary electrical connection structure, located between the first gate and an electrical connection structure facing toward the first gate to electrically connect the first gate and the electrical connection structure facing toward the first gate; and a second auxiliary electrical connection structure, located between the second gate and an electrical connection structure facing toward the second gate to electrically connect the second gate and the electrical connection structure facing toward the second gate.

18. The semiconductor structure according to claim 15, wherein the gate electrical connection structure further comprises: a third auxiliary electrical connection structure, located between adjacent electrical connection structures to electrically connect the adjacent electrical connection structures.

\* \* \* \* \*